(No Model.)
S. S. WILLIAMS.
VENTILATOR.
No. 577,221. Patented Feb. 16, 1897.
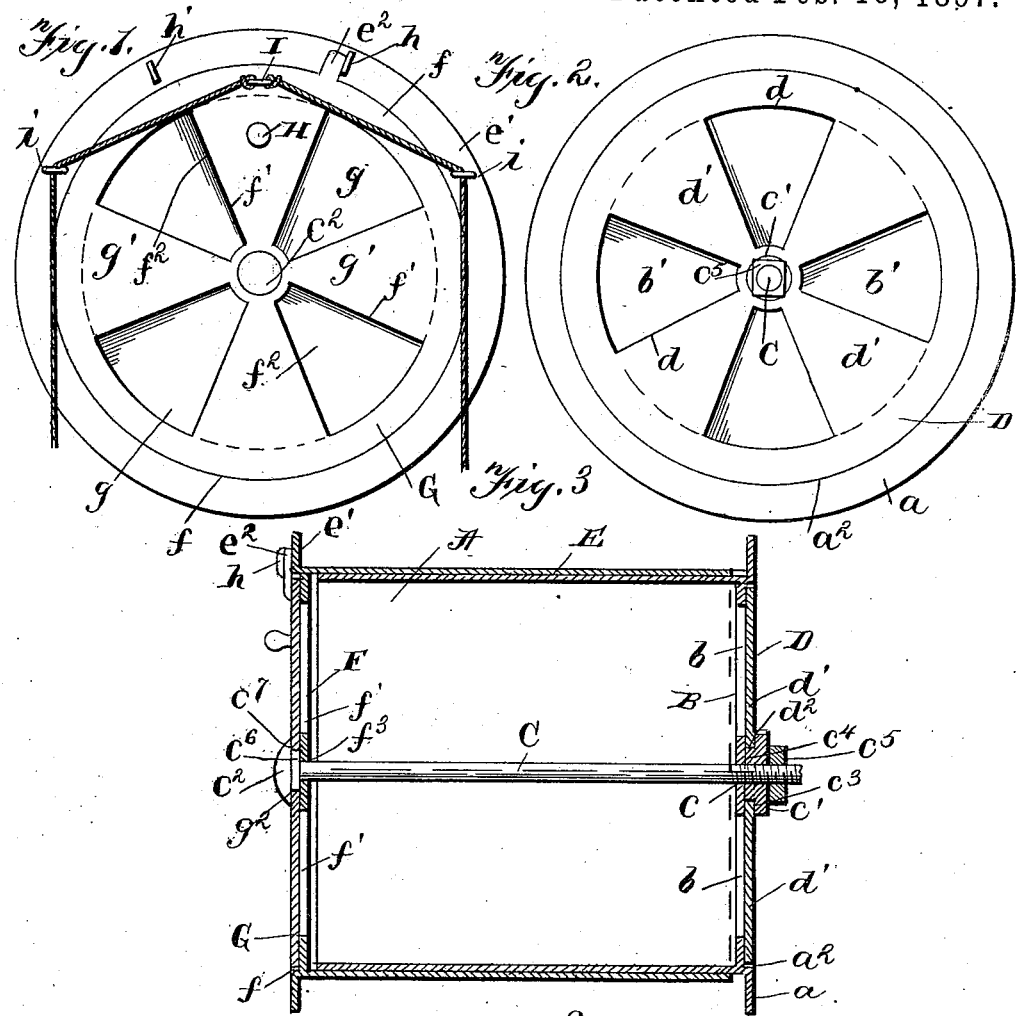
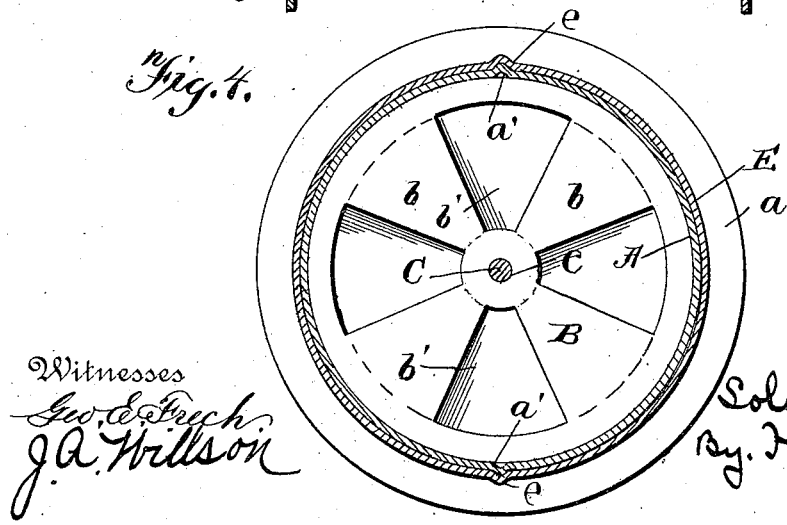
Witnesses
Geo. E. Frech
J. A. Willson
Inventor
Solomon S. Williams
By H. B. Willson.
Attorney

UNITED STATES PATENT OFFICE.

SOLOMON S. WILLIAMS, OF ALTOONA, KANSAS.

VENTILATOR.

SPECIFICATION forming part of Letters Patent No. 577,221, dated February 16, 1897.

Application filed July 18, 1896. Serial No. 599,691. (No model.)

*To all whom it may concern:*

Be it known that I, SOLOMON S. WILLIAMS, a citizen of the United States, residing at Altoona, in the county of Wilson and State of Kansas, have invented certain new and useful Improvements in Ventilators; and I do declare the following to be a full, clear, and exact description of the invention, such as will enable others skilled in the art to which it appertains to make and use the same.

My invention has relation to improvements in ventilators for general use in offices, dwellings, and the like, and the object is to produce a simple, cheap, and durable device of this class; and to this end the novelty consists in the construction, combination, and arrangement of the same, as will be hereinafter more fully described, and particularly pointed out in the claim.

In the accompanying drawings the same letters of reference indicate the same parts of the invention.

Figure 1 is a front elevation of my improved ventilator. Fig. 2 is a rear view. Fig. 3 is a longitudinal section, and Fig. 4 is a transverse section.

A is the cylindrical thimble, formed with a circular flange or collar $a$ and a stationary diaphragm B, having radial openings $b$ and solid portions $b'$ between said openings, and a circular central orifice $c$, through which the shaft C passes. The stationary diaphragm B is set a little inwardly from the plane of the face of the flange or collar $a$, so as to form a circular recess $a^2$, in which is located an oscillating circular valve D, having radial openings $d$ and solid portions $d'$, corresponding to and registering with the similar openings $b$ and solid portions $b'$ in the diaphragm B. This valve D is provided with a central square hole $d^2$, through which the square integral collar $c^4$ of the nut $c'$ passes, the shoulder $c^3$ of said nut resting against the diaphragm, and a lock-nut $c^5$ serves to secure said nut rigidly on the shaft C, so that when said shaft is oscillated or partially rotated it carries the nut with it, and the valve being mounted on the square collar of the nut the shaft, nut, and valve all rotate or oscillate together.

The thimble A is formed with two longitudinally-projecting ribs $a'\ a'$, which slide freely in the corresponding female grooves $e\ e$ in the cylindrical sleeve E, which slides freely and snugly over the thimble, and its outer end is formed with a circular flange or collar $e'$, and an integral diaphragm F is located a little below the plane of the flange to form a recess $f$, in which is mounted a circular valve G. This diaphragm F is formed with a series of radial openings $f'$ and corresponding series of solid portions $f^2$, alternate with the openings. A circular orifice $f^3$ forms a bearing for this end of the shaft C, which passes through the square central opening $g^2$ in the valve G, and its end is formed with a square integral collar $c^6$, upon which said valve is mounted, the shoulder $c^7$ of said collar resting against the diaphragm, leaving the valve and shaft free to turn. The extreme end of the shaft is formed with an enlarged head $c^2$, which serves to hold the valve in place.

The valve is formed with radial openings $g$, alternating with the solid portions $g'$, corresponding to the diaphragm F, and H is a handle secured to the valve, by means of which it may be directly operated by hand, its motion being limited by the stops $h\ h'$, secured to the face of the flange $e'$, so that when the lug $e$ on the valve is against the stop $h$ the valve is closed and when in contact with the stop $h'$ the valve is open, and of course it may be regulated to any degree between the two points.

I is an integral eyebolt or stud on the valve, and from it a duplex cord runs through the eyes $i\ i$ in the flange to within reach of a person standing on the floor when the ventilator is located in the wall near the ceiling.

In practice the shaft C is made in the first case long enough to extend through the thimble and sleeve when they are drawn out to their full length, and, a hole being cut through the wall at the proper point, the thimble is first inserted from the outside, so that its flange will be approximately flush with the outside wall. The sleeve is then inserted with its grooves in line with the ribs on the thimble, and it is then pressed inwardly over the thimble until its flange is approximately flush with the wall. The inner valve and shaft are then inserted from the inside and the outer valve and nut secured upon the outer end of the shaft, the end of said shaft beyond the nuts being cut off flush, and care being taken when assembling the parts that all the openings in both the diaphragms and the valves are in line when the lug $e^2$ is against the stop $h'$.

On screwing the nut up, the shaft, the sleeve, and thimble are held securely together, with their respective flanges in contact with the inner and outer faces of the wall by means of the shoulder $c^6$ on the shaft and the corresponding shoulder $c^3$ on the nut pressing against the face of the diaphragms, while the valves are left free to be rotated by the shaft.

The operation of the ventilator will be readily understood from the foregoing.

Having thus fully described my invention, what I claim as new and useful, and desire to secure by Letters Patent of the United States, is—

A ventilator comprising the cylindrical thimble A having integral ribs $a'\ a'$, external flange $a$, recess $a^2$, and rigid diaphragm B having radial openings $b$, and the cylindrical sleeve E having guide-grooves $e\ e$, external flange $e'$, and integral diaphragm F having radial openings $f$ and circular orifice $a$, the flange $e'$ being provided with integral stops $h\ h'$, in combination with the screw-shaft C, formed with the square collar $c^6$ having shoulder $c^7$ and the nut $c'$ having square collar $c^4$ and shoulder $c^3$, the circular valve D having radial openings $d$, and a central square hole $d^2$ through which the square collar $c^4$ of the nut $c'$ passes, and the valve G having radial openings $g$, the lug $e^2$, and the central square hole $g^2$ through which the square collar $c^6$ of the shaft passes, substantially as shown and described.

In testimony whereof I hereunto affix my signature in presence of two witnesses.

SOLOMON S. WILLIAMS.

Witnesses:
CHARLES THURMAN,
I. V. HORNADAY.